United States Patent [19]

Iwata et al.

[11] Patent Number: 5,524,104
[45] Date of Patent: Jun. 4, 1996

[54] COMPACT DISK DRIVE ARRANGEMENT WITH ONE DISK MOUNTED ON TOP OF ANOTHER

[75] Inventors: Hirokimi Iwata, Ibaragi; Ryuzou Tamayama, Kanagawa, both of Japan

[73] Assignee: Sony Corporation, Tokyo, Japan

[21] Appl. No.: 336,574

[22] Filed: Nov. 9, 1994

Related U.S. Application Data

[63] Continuation of Ser. No. 36,484, Mar. 24, 1993, abandoned.

[30] Foreign Application Priority Data

Mar. 30, 1992 [JP] Japan .................................. 4-073788

[51] Int. Cl.$^6$ .............................. G11B 33/12; H05K 7/14
[52] U.S. Cl. ................................. 369/77.2; 361/685
[58] Field of Search .................. 369/77.2, 75.1, 369/77.1; 361/724, 725, 728, 729, 730, 807, 683, 684, 685, 686; 364/708.1; 360/97.01; 312/333, 334.7; 248/27.3

[56] References Cited

U.S. PATENT DOCUMENTS

| | | | |
|---|---|---|---|
| 4,736,356 | 4/1988 | Konshak | 369/77.2 |
| 4,937,771 | 6/1990 | Rumps, Jr. et al. | 361/685 |
| 5,058,045 | 10/1991 | Ma | 361/729 |
| 5,062,016 | 10/1991 | Zupancic | 360/97.01 |
| 5,062,100 | 10/1991 | Verhoeven et al. | 369/77.2 |
| 5,067,041 | 11/1991 | Cooke et al. | 361/730 |
| 5,136,466 | 8/1992 | Remise et al. | 361/685 |
| 5,136,468 | 8/1992 | Wong et al. | 361/725 |
| 5,175,670 | 12/1992 | Wang | 361/724 |
| 5,208,722 | 5/1993 | Ryan | 361/685 |
| 5,211,459 | 5/1993 | Wu | 361/685 |
| 5,227,954 | 7/1993 | Twigg | 361/725 |
| 5,301,088 | 4/1994 | Liu | 361/685 |
| 5,306,079 | 4/1994 | Liu | 361/685 |
| 5,392,192 | 2/1995 | Dunn et al. | 361/683 |
| 5,452,179 | 9/1995 | Sasaki | 361/685 |

FOREIGN PATENT DOCUMENTS

| | | | |
|---|---|---|---|
| 424178 | 4/1991 | European Pat. Off. . | |
| 2-71480 | 3/1990 | Japan | 369/77.1 |
| 3-91297 | 4/1991 | Japan | 361/724 |
| 3-237671 | 10/1991 | Japan . | |

OTHER PUBLICATIONS

Personal Computing Magazine, "Wells American ad", Feb. 1989, vol. 13, No. 2, p. 19.
Personal Computing Magazine, "Seagate ad", Oct. 1987, vol. 11, No. 10, p. 106.
IBM Technical Disclosure Bulletin, "Mounting Method for Disk Drive Unit", vol. 29, No. 10, Mar. 1987, p. 4655.
IBM Technical Disclosure Bulletin, "Direct–Access Storage Device Commodity–Stacking Plates", vol. 30, No. 1, Jun. 1987, p. 392.
IBM Technical Disclosure Bulletin, vol. 28, No. 11, "Interchangeable Diskette Drives", Apr. 1986, pp. 4916–4917.

*Primary Examiner*—Stuart S. Levy
*Assistant Examiner*—David L. Ometz
*Attorney, Agent, or Firm*—Limbach & Limbach

[57] ABSTRACT

A disk drive arrangement has a first disk drive such as a CD-ROM drive mounted below a second disk drive such a hard disk drive. The two drives share a single front panel which mounts controls and indicators related to both drives and may also include a disk access opening for at least one of the drives. The upper and lower drives may be secured by left and right side brackets to enhance mounting stability and facilitate easy installation in an electronic component.

23 Claims, 6 Drawing Sheets

COMPACT DISK DRIVE ARRANGEMENT WITH ONE DISK MOUNTED ON TOP OF ANOTHER

This is a continuation of application Ser. No. 08/036,484 field on Mar. 24, 1993, now abandoned.

BACKGROUND OF THE INVENTION

1. Field of the Invention

The present invention relates generally to a disk drive arrangement for computers, and computer based components, such as TV games and the like. Specifically, the invention relates to a convenient arrangement by which a plurality of different disk drives may be mounted as a single component.

2. Description of the Prior Art

Recently, disk drives have been widely used for various computer, communications and other computer based applications. Given the recent increase of computer based components in businesses and in the home, various types of disks and drives have been introduced, in some cases necessitating that more than one, or more than one type of disk drive be utilized. This is increasingly true since the use of CD-ROM drives has become popularized for various computer environments. Since such drives are of a read only type, a user must usually rely on a magnetic type drive, such as a hard disk, or floppy disk drive for writing or storage of data.

In such a situation, arrangement of the system may become unwieldy due to a large number of components to be connected. Thus, is has been required to conveniently mount a plurality of disk drives in a compact space wherein they may be treated as a single component. It has further been required to provide such combined components in order to simplify manufacture of computers, game devices, and the like, when such components are to be installed as part of a larger system or apparatus.

SUMMARY OF THE INVENTION

It is therefore a principal object of the present invention to overcome the drawbacks of the prior art.

It is a further object of the present invention to provide a single component which may incorporate a plurality of disk drives in a compact space and in which interconnection between system components is simplified.

In order to accomplish the aforementioned and other objects, a disk drive arrangement is provided, comprising: a first disk drive, a second disk drive arranged on top of and supported by, the first disk drive, and a front panel having arranged thereon controls and indicators related to the functioning of the first and second disk drives.

DESCRIPTION OF THE PREFERRED EMBODIMENT

Figure 1A:
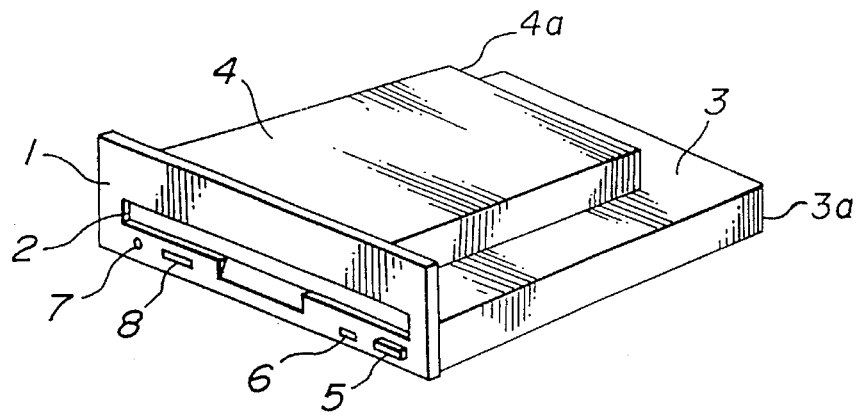
FIG. 1(A) is a perspective view of a first embodiment of a disk drive arrangement according to the invention.
Figure 1B:
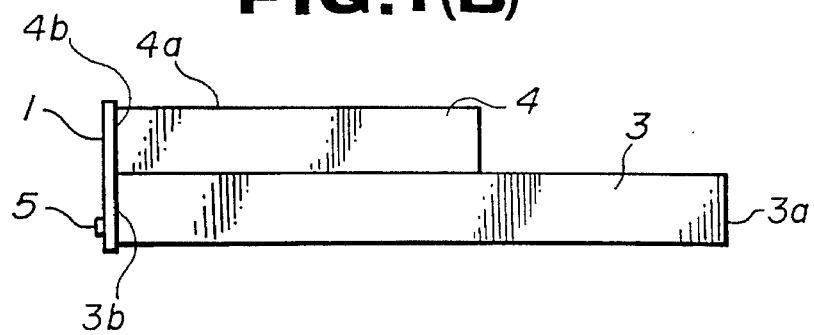
FIG. 1(B) is a side view of the disk drive arrangement of FIG. 1(A)

Referring now to the drawings, particularly to FIGS. 1(A) and 1(B), a first embodiment of a disk drive arrangement according to the invention will be described in detail.

Referring to FIG. 1(A), a disk drive arrangement according to the invention comprises a front panel 1 having a disk insert opening 2 formed therethrough. The panel has a standard 'half height' vertical dimension of 42.5 mm. According to the present embodiment, a first lower disk drive 3 (hereinbelow; optical drive 3) is a read only optical disk drive, and is contained in a rectangular housing 3a, such as a CD-ROM drive for example, and which has a front portion 3b which is mounted to a lower rear surface of the font panel 1 and, a second, upper disk drive 4 (hereinbelow; magnetic drive 4) is a readable/writable magnetic, hard disk drive which is contained in a rectangular housing 4a and which has a front portion 4b which is mounted to the rear side of the front panel 1 above the optical drive 3. The housing 3a acts as a support for the second disc drive 4. The disk insert opening 2 communicates with a disk receiving portion of the lower disk drive 3. A width dimension of the lower (optical) disk drive 3 may be equal to a width dimension of the front panel 1 while a height dimension is a so-called quarter height (i.e. 21.25 mm), that is, half the vertical dimension of the front panel 1.

As mentioned above, the magnetic drive 4 is a hard disk type wherein no disk access opening is required and is mounted to a rear side of the front panel 1 above the optical drive 3 such that the two drives are joined as a single component. According to the present embodiment, the width dimension of the magnetic drive 4 is smaller that that of the optical drive 3 while a vertical dimension of the magnetic drive 4 is the same as that of the optical drive 3.

Further, according to the present embodiment, the front panel 1 is further equipped with an eject button 5 and LED 6 a headphone jack 7 and a volume control 8.

The drives 3 and 4 are respectively supplied with optical disks, or CD's and magnetic disks (not shown in the drawings) according to user requirements.

It will be noted that, although, according to the above-described embodiment, an optical CD-ROM drive is employed, a magneto optical (MO) or a write once (WO)

drive may alternatively be employed in the disk drive arrangement according to the invention.

Figure 2A:
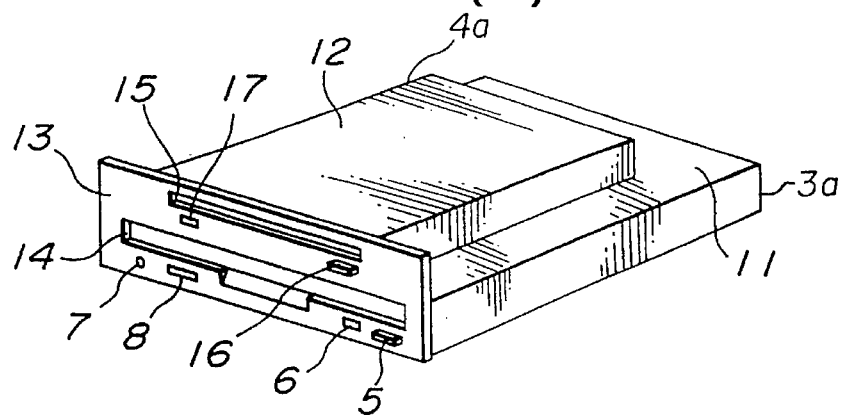
FIG. 2(A) is a perspective view of a second embodiment of a disk drive arrangement according to the invention.
Figure 2B:
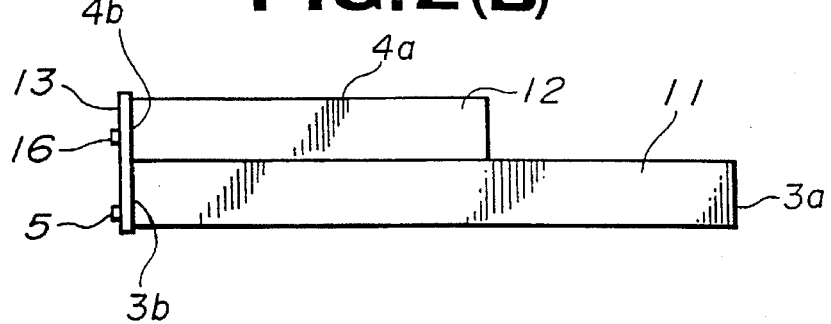
FIG. 2(B) is a side view of the disk drive arrangement of FIG. 2(A)

Hereinbelow, a second embodiment of a disk drive arrangement according to the invention will be described with reference to FIGS. 2(A) and 2(B).

The disk drive arrangement of the second embodiment is substantially of the same construction as the above described first embodiment, except that, instead of a the magnetic drive 4 being a hard disk drive, a floppy disk disk drive 12 is provided. According to this, a front panel 13 of the second embodiment is provided with a lower disk access opening 14 for a lower, optical drive 11, which may be a CD-ROM drive as utilized in the first embodiment, and an upper disk access opening 15 for the upper, floppy disk drive 12. Thus, in addition to the eject button 5, LED 6, headphone jack 7 and volume control 8 of the first embodiment, a second eject button 16 as well as a second LED 17 are provided for the upper floppy disk drive 12. In other respects, the dimensions and arrangement of the two disk drives 11 and 12 of the second embodiment are identical to those of the above-described first embodiment.

Further, although, according to the above-described embodiments, the optical drives 3 or 11 are arranged in a lower position relative the magnetic drives 4 or 12, this arrangement may be reversed, although it is preferable that the disk drive having the larger width and/or length dimension be arranged in the lower position.

Hereinbelow, a third embodiment of a disk drive arrangement according to the invention will be described with reference to FIGS. 3(A) and 3(B).

Figure 3A:
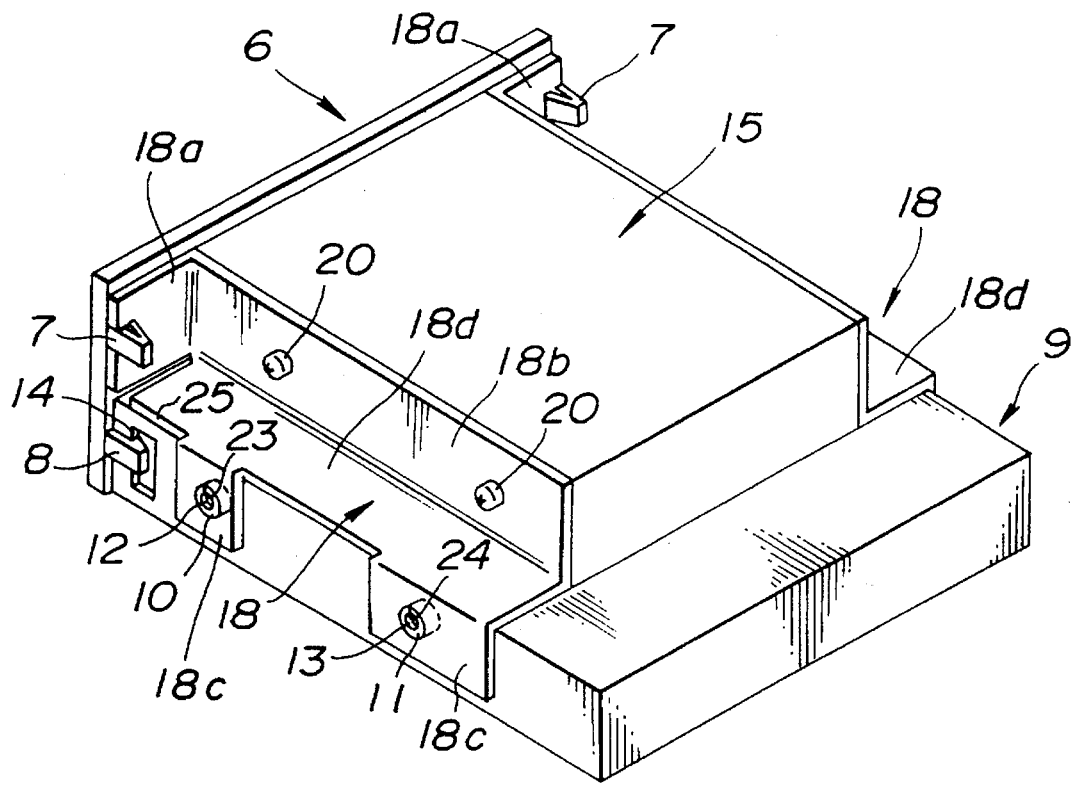
FIG. 3(A) is a rear perspective view of a third embodiment of a disk drive arrangement according to the invention.

As may be seen from the rear perspective view of FIG. 3(A), in addition to the common front panel 6 which is also a feature of the first and second embodiments, the present embodiment further features side brackets 18 for additional mounting stability for the two disk drives 9 and 15.

Each of the side brackets 18 comprises a horizontally disposed plate 18*d* having a first vertical upper wall portion 18*b* extending perpendicularly upward along one longitudinal edge of the plate 18*d* and a plurality of vertical lower tab portions 18*c* extending perpendicularly downward from a longitudinal edge of the plate 18*d* opposite the edge from which the upper wall portion 18*b* upwardly extends. In addition, a front support tab 18*a* is formed on each of the upper wall portions 18*b* so as to extend perpendicularly outward of the upper wall portions 18*b* from a forward vertical edge thereof. The brackets 18 are formed in opposing mirror image fashion such that a bracket 18 for one side of the mounting arrangement is structurally exactly opposite that mounted at the other side of the arrangement, as may be appreciated viewing FIG. 3(B).

Figure 3B:
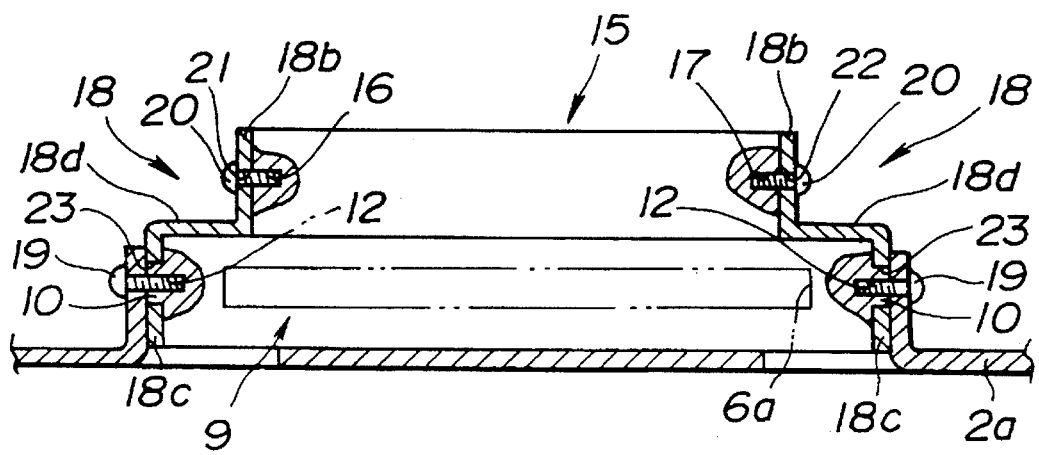
FIG. 3(B) is a rear view of the disk drive arrangement of FIG. 3(A)

Also referring to FIG. 3(B), according to the present embodiment, mounting of the upper disk drive 15, which may, for example, be a HDD (Hard Disk Drive) and the lower disk drive, which may, for example, be a CD-ROM drive, is facilitated by threaded screw holes 16, 17 which are provided in the upper drive at locations corresponding to circular openings 21, 22 provided in the upper wall portion 18*b* of each of the brackets 18 and circular mounting projections 10, 10 having formed therein concentrically formed threaded screw holes 12, 12. The positions of the circular projections 10, 10 correspond to the locations of mounting openings 23, 24, 23, 24 formed in the lower tab portions 18*c* of each of the brackets 18.

The upper drive 15 is attached to the brackets 18, 18 via screws 20, 20 which pass through the circular openings 21, 22 to engage the threaded screw holes 16, 17 Formed in the casing of the upper disk drive 15.

Figure 5A:
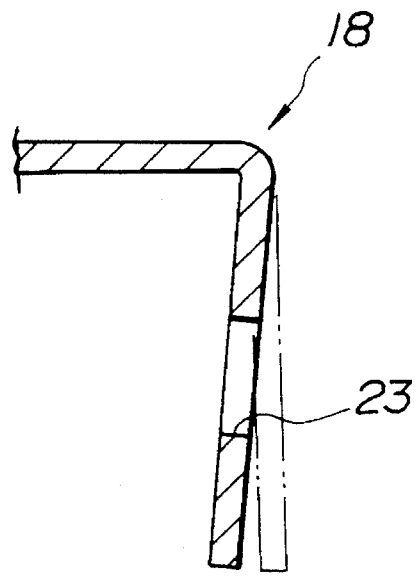
FIG. 5(A) and (B) are cross-sectional views of a bracket and screw used for retaining side portions of disk drives according to the third embodiment.
Figure 5B:
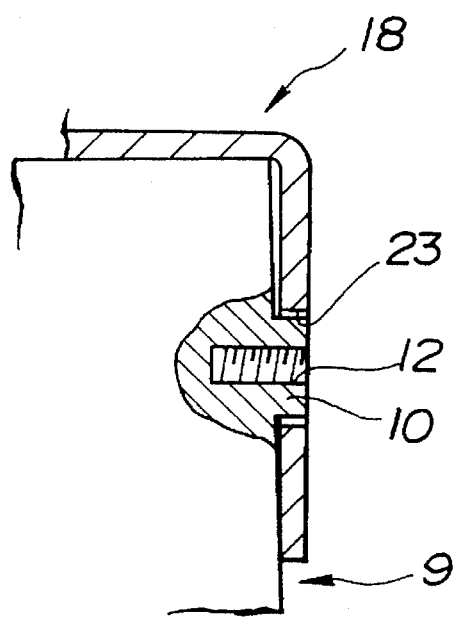
Figure 7:
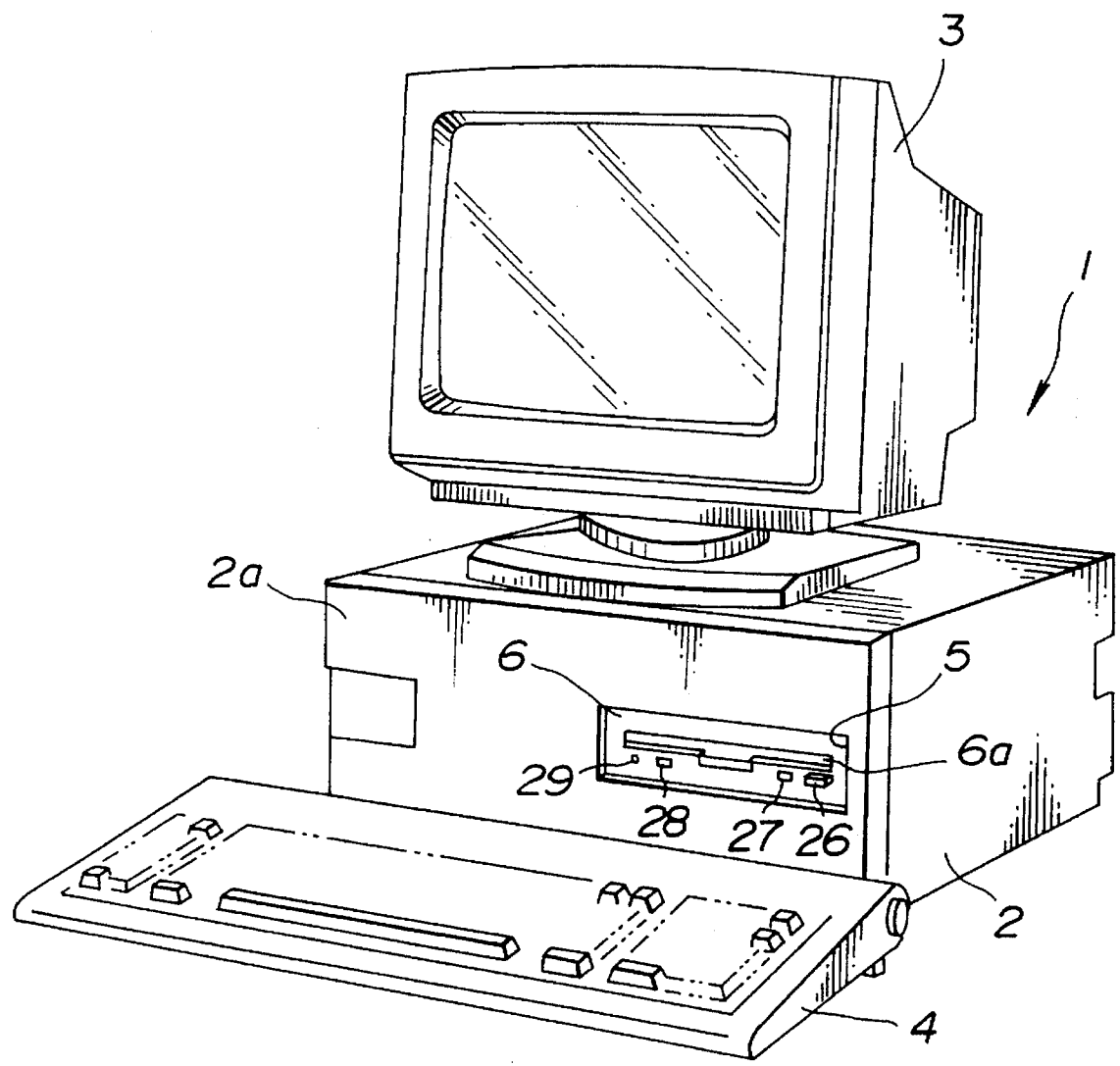
FIG. 7 is a perspective view of a computer in which a disk drive arrangement according to the invention is mounted.

As seen in FIG. 3(B) and in FIGS. 5(A) and 5(B), the lower drive is attached to the brackets 18, 18 via screws 19, 19 which are of a length sufficient to pass through a mounting portion of a chassis 2*a* of an electronic component 2 in which the first and second disk drives are to be mounted (see also FIG. 7), to engage the threaded openings 12, 12 provided in the mounting projections 10, 10 of the lower disk drive 15. The mounting projections 10 protrude through the circular openings 23, 24 provided in the lower tab potions 18*b* of each of the brackets 18.

Figure 4A:
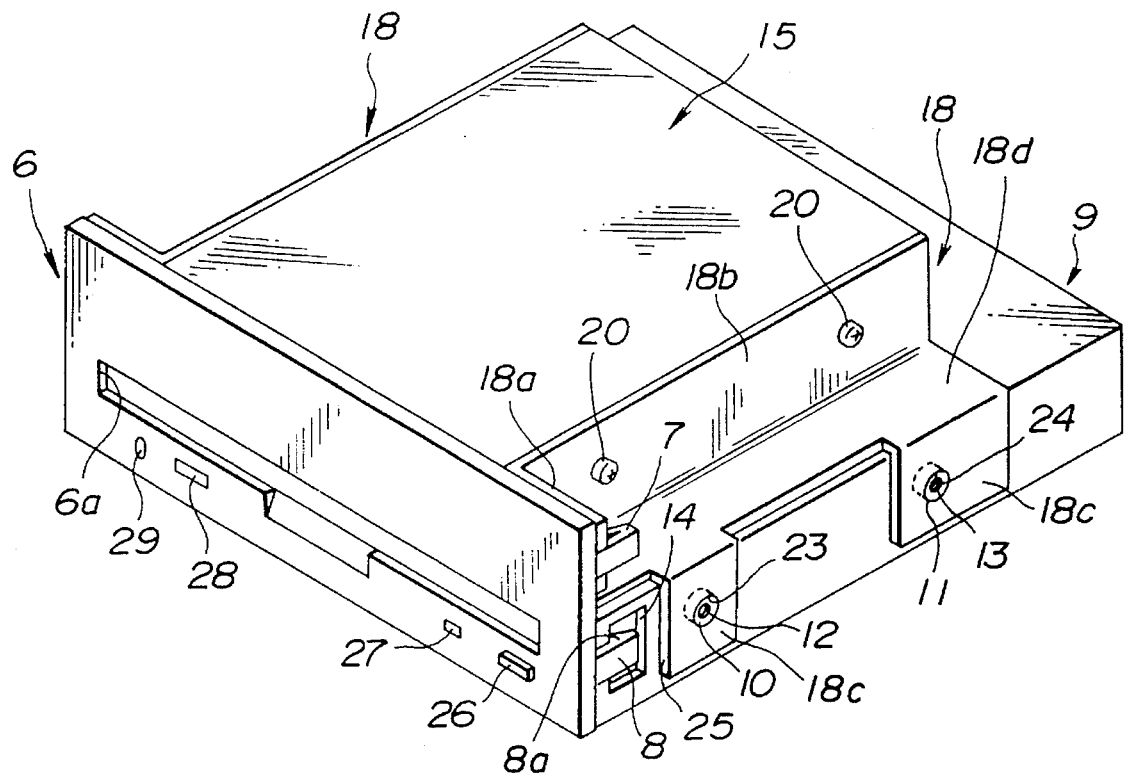
FIG. 4(A) is a frontal perspective view of the disk drive arrangement of the third embodiment.
Figure 4B:
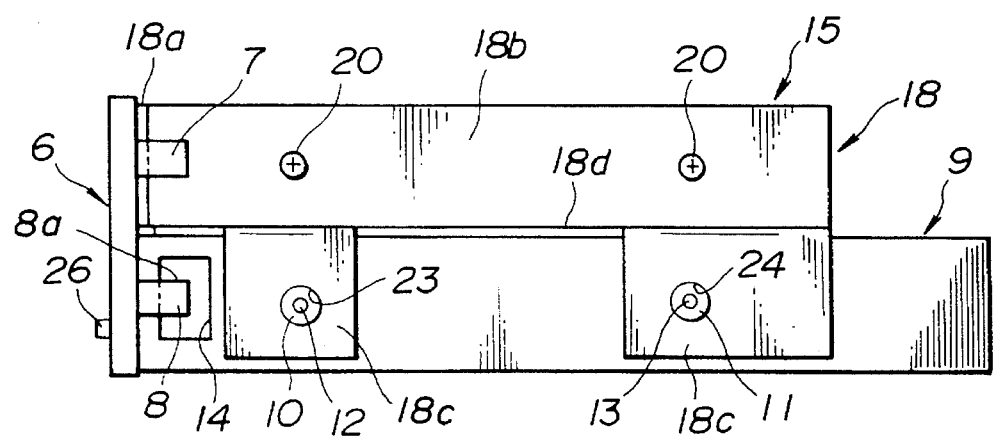
FIG. 4(B) is a side view of the disk drive arrangement of the third embodiment.

Referring now to FIGS. 4(A) and (B) a frontal perspective view and a side view of tile above described third embodiment is shown. Similarly to the previously described embodiments, the front panel is provided with an assortment of controls and features related to the operation and use of the upper and lower disk drives. According to the present embodiment these controls and features include, a disk access opening 6*a*, an LED 27 an eject button 26, a volume control 28 and a headphone jack 29, although, it will be noted that any other types of controls and/or features may be present according to the types of disk drives utilized as the upper and lower drives or to a particular application for which the drives are to be used.

As may be seen in the drawings, according to the present embodiment, the front panel 6 is additionally provided with rearwardly extending upper clips 7 and lower clips 8 for providing added support and stability to the disk drive mounting arrangement of the invention. The upper and lower clips 7, 7 and 8, 8 respectively engage the front support tabs 18*a*, 18*a* of the brackets 18. 18 and mounting recesses 14, 14 formed at forward side portions on each side of tile lower drive 9.

As may be seen in FIG. 4(A), inwardly facing hook portions 8*a* of the lower clips 8 engage a forward edge of the mounting recesses 14 to securely fasten the front panel 6 to the front side of the lower drive 9.

Figure 6:
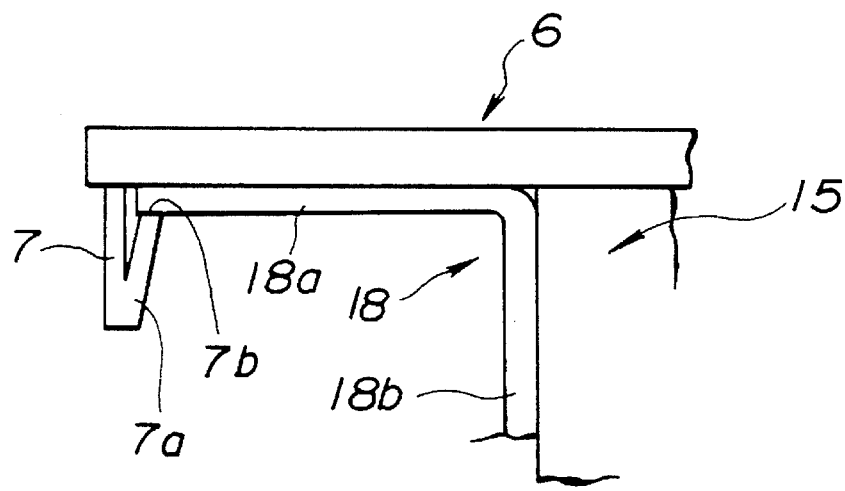
FIG. 6 is a plan view of a corner portion of the third embodiment showing engagement between the bracket of FIG. 5(A) and the front panel of the disk drive arrangement of the invention.

Alternatively, referring to FIG. 6, it may be seen that hook portions 7*a*, 7*a* of the upper clips 7, 7 are provided with substantially flat front surfaces 7*b*, 7*b* which are substantially parallel to a back surface of the front panel 6 and spaced therefrom by a predetermined distance which is substantially equal to a width of the front support tabs 18*a*, 18*a* projecting from the upper wall portions 18*b*, 18*b* of the brackets 18, 18. Thus, as shown in FIG. 6, the upper portion of the front panel is securely fastened to the front side of the upper drive 15. It will be noted that the upper and lower clips may be of identical configuration and still accomplish their respective functions. It will further be noted that a forward edge 25 of the forwardmost of the lower tab portions 18*c* must be set to be rearward of the mounting recess 14 in order to facilitate engagement of the lower clip 8.

Referring again to FIGS. 5(A) and (B), it may be seen in FIG. 5(A) that the lower tab portions 18*c* are bent inwardly, that is, they do not extend downward exactly perpendicularly from the edge of the plate 18*d* but are bent inwardly toward the facing surface of the lower disk drive 9. Thus, when the lower disk drive 9 is fitted between the lower tab portions 18*c*, 18*c*, 18*c*, 18*c*, of the left and right brackets 18, 18, the lower tab portions 18*c*, 18*c*, 18*c*, 18*c*, exert inward squeezing pressure on the sides of the lower disk drive 9. Thus, this squeezing pressure, in combination with the engagement of the mounting projections 10 formed in the sides of the lower disk drive 9 with the circular openings 23, 24 formed respectively in the lower tab portions 18*c*, 18*c*, allows the lower drive to be suspended from the upper drive, which is attached to the upper wall portions of each of the brackets 18 via screws 20, prior to installation in an electronic component 2.

Thus, during installation the first and second drives are retained between the left and right brackets 18, 18 which are screwed to the upper drive at the upper wall portions 18b thereof and fastened to the front panel 6 by the upper and lower clips 7, 7, and 8, 8 such that the entire assembly may be positioned appropriately at the mounting portion of the chassis 2a of the electronic component 2 before being finally attached to the electronic component by installation of the screws 19 which pass through mounting holes in the chassis 2a to engage the threaded openings 12 provided in the mounting projections 10 of the lower drive 9. Upon engagement of the screws 19 the disk drive mounting arrangement of the invention is finally and securely mounted within the electronic component.

It will be noted that, although, according to the third embodiment, a plurality of downwardly projecting tabs 18c are utilized, the arrangement of the invention may be implemented by provision of a single tab 18c or by provision of a downwardly projecting lower wall portion 18c having a plurality of mounting openings 23, 24, . . . provided therethrough.

It will further be noted that, as in the previous embodiments, a width dimension of the lower disk drive 9 may be substantially equal to a width dimension of the front panel 1 while a height dimension is a so-called quarter height (i.e. 21.25 mm), that is, half the vertical dimension of the front panel 1 and that the upper drive is also of a quarter height dimension.

Figure 8A:
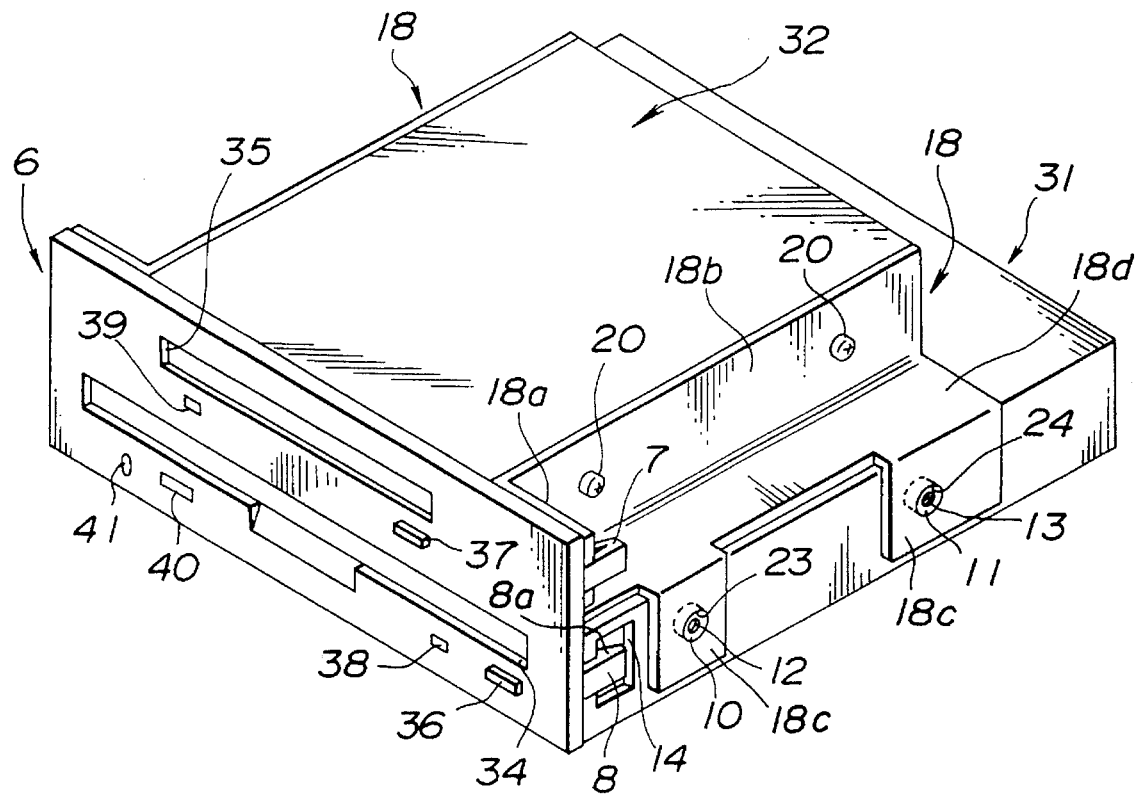
FIG. 8(A) is a frontal perspective view of a fourth embodiment of a disk drive arrangement of the invention.
Figure 8B:
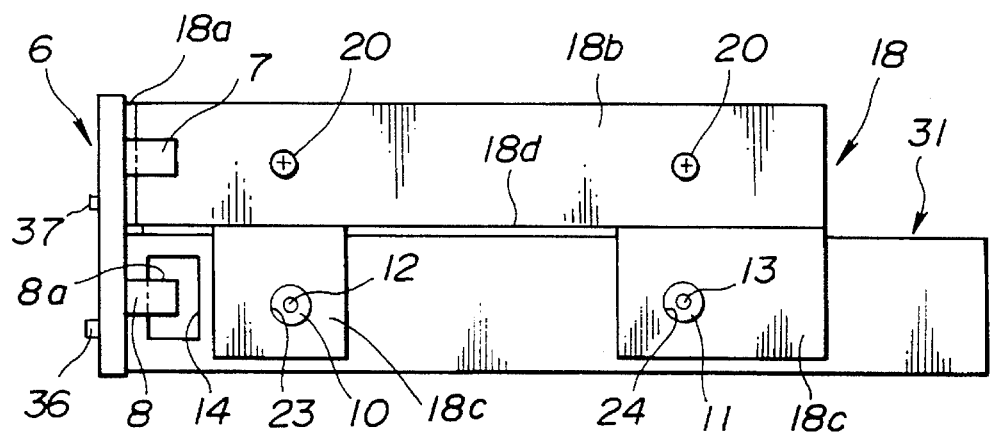
FIG. 8(B) is a side view of the disk drive arrangement of FIG. 8(A).

Hereinbelow, a fourth embodiment of a disk drive arrangement according to the invention will be described with reference to FIGS. 8(A) and 8(B).

The disk drive arrangement of the fourth embodiment is substantially of the same construction as the above described first embodiment, except that, an upper drive 32 is a floppy disk drive. According to this, a front panel 6 off the fourth embodiment is provided with a lower disk access opening 34 for a lower, optical drive 31, which may be a CD-ROM drive as utilized in the first embodiment, and an upper disk access opening 35 is provided for the upper, floppy disk drive 32. Thus, in addition to an eject button 36, an LED 38, a headphone jack 41 and a volume control 40, a second eject button 37 as well as a second LED 39 are provided for the upper floppy disk drive 32. In other respects, the dimensions and arrangement of the two disk drives 31 and 32 of the fourth embodiment are identical to those of the above-described third embodiment.

Further, although, according to the above-described embodiments, the larger, lower disk drive is arranged in a lower position relative a smaller, upper disk drive, this arrangement may be reversed, although it is preferable that the disk drive having the larger width and/or length dimension be arranged in the lower position.

Thus, according to the present invention, a simple, convenient disk drive arrangement by which a plurality of disk drives may be easily mounted and used substantially as a single unit is achieved. Thus, space and connections necessary for utilizing such drives are reduced and set up of a system employing such drives is simplified.

While the present invention bas been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A disk drive arrangement comprising:

first disk drive having formed on sides thereof mounting projections projecting outward from right and left sides thereof in a direction of projection, said mounting projections having threaded openings formed therein in the direction of projection;

a second disk drive arranged on top of and supported by said first disk drive and having screw holes provided on right and left sides thereof, a width of said second disk drive being less than a width of said first disk drive;

left and right brackets, each bracket including a substantially horizontal plane portion resting on substantially horizontally extending top portions of said first disk drive where the width of said first disk drive exceeds said second disk drive on either side of said second disk drive, and upper wall portions extending upward substantially perpendicularly from a side of said plane portions adjacent said left or right sides of said second disk drive and having openings formed therethrough at locations corresponding to those of said screw holes, and lower tab portions extending downward from an outer side of said plane portions adjacent said left or right sides of said first disk drive and having openings formed therethrough conforming in size, shape and location to said mounting projections so as to receive said mounting projections of said first disk drive therethrough, and front support tabs extending substantially perpendicularly outward from a forward edge of said wall portions in a direction opposite that of an adjacent left or right side of said second disk drive to a dimension not greater than an outermost width of said first disk drive;

a front panel, said front panel having a width dimension at least equal to a width of said first disk drive and a height dimension at least equal to a combined height of said first and second disk drives and having controls and indicators related to the functioning of said first and second disk drives arranged thereon, and further including first hook portions extending substantially horizontally from rear side edges thereof so as to secure said front support tabs of said left and right brackets to a rear side of said front panel;

first screws engaging said screw holes of said second disk drive with said wall portions of said left and right brackets interposed between said screws and said screw holes; and second screws engaging said threaded openings formed in said mounting projections of said first disk drive projecting through said openings of said lower tab portions.

2. A disk drive arrangement as set forth in claim 1, wherein said first disk drive further includes mounting recesses formed at a forward end of each of said right and left sides thereof and said front panel further includes second hook portions extending horizontally from said rear side edges thereof from a location below said first hook portions so as to engage said mounting recesses securing a front side of said first disk drive to a rear side of said front panel.

3. A disk drive arrangement as set forth in claim 2, wherein said first and second hook portions are identically configured.

4. A disk drive arrangement as set forth in claim 2, wherein a forward edge of the forwardmost of the lower tab portions of each bracket are set rearward of said mounting recess of said first disk drive.

5. A disk drive arrangement as set forth in claim 1, wherein said first disk drive is a a CD-ROM drive and said second disk drive is a hard disk drive, said front panel including a disk access opening for said CD-ROM drive.

6. A disk drive arrangement as set forth in claim 5, wherein said controls and indicators of said front panel including a disk access opening, an eject button, an LED, a volume control and a headphone jack.

7. A disk drive arrangement as set forth in claim 1, wherein said first screws pass through a mounting portion of a chassis of an electronic component which is interposed between said second screws and said mounting projections before engaging said threaded openings.

8. A disk drive arrangement as set forth in claim 1, wherein said first hook portions are provided with substantially flat front surfaces which are substantially parallel to a back surface of the front panel and spaced therefrom by a predetermined distance which is substantially equal to a width of the front support tabs projecting from the upper wall portions of the brackets.

9. A disk drive arrangement as set forth in claim 1, wherein said lower tab portions of each bracket are bent inwardly, toward the facing surface of the lower disk drive such that squeezing pressure is applied to said right and left sides of said first disk drive when said first screws engage said screw holes of said second disk drive via said wall portions of said brackets.

10. A disk drive arrangement as set forth in claim 1, wherein said first disk drive is a CD-ROM drive and said second disk drive is a floppy disk drive, said front panel being provided with a lower disk access opening for said CD-ROM drive, an upper disk access opening for said floppy disk drive, a first eject button, a first LED, a headphone jack, a volume control, a second eject button and a second LED.

11. A disk drive arrangement as set forth in claim 1, wherein said first and second disk drives are of the same type.

12. A disk drive arrangement as set forth in claim 1, wherein said first and second disk drives are of different types.

13. A disk drive arrangement as set forth in claim 1, wherein said front panel includes a disk access opening for at least one of said first and second disk drives.

14. A disk drive arrangement as set forth in claim 1, wherein said first disk drive is a magneto optical disk drive and said second disk drive is a hard disk drive.

15. A disk drive arrangement as set forth in claim 1, wherein said first disk drive is a CD-ROM disk drive and said second disk drive is a magneto optical disk drive.

16. A disk drive arrangement as set forth in claim 1, wherein one of said first and second disk drives is an optical disk drive and the other is a magnetic disk drive.

17. A disk drive arrangement as set forth in claim 1, wherein a vertical dimension of said front panel is 42.5 mm.

18. A disk drive arrangement as set forth in claim 1, wherein a vertical dimension of said first disk drive is half the vertical dimension of said front panel.

19. A disk drive arrangement as set forth in claim 1, wherein a width dimension of said first disk drive is equal to a width dimension of said front panel.

20. A disk drive arrangement as set forth in claim 1, wherein a vertical dimension of said second disk drive is the same as a vertical dimension of said first disk drive.

21. A disk drive arrangement as set forth in claim 1, wherein said controls and indicators include one or more of an eject button, an LED, a headphone jack and a volume control.

22. A disk drive arrangement as set forth in claim 1, wherein said controls and indicators include one or more of a first eject button, a second eject button, an LED, a headphone jack, a first disk access indicator light, a second disk access indicator light and a volume control.

23. A disk drive arrangement as set forth in claim 1, wherein a width dimension of said front panel is greater than a width dimension off both of said first and second disk drives.

* * * * *